Patented July 4, 1933

1,916,778

UNITED STATES PATENT OFFICE

HERMANN WAGNER, OF SODEN-ON-THE-TAUNUS, AND HERBERT KRACKER, OF FRANKFORT-ON-THE-MAIN, GERMANY, ASSIGNORS TO GENERAL ANILINE WORKS, INC., OF NEW YORK, N. Y., A CORPORATION OF DELAWARE

WATER-INSOLUBLE AZO-DYESTUFF AND FIBER DYED THEREWITH

No Drawing. Application filed March 12, 1931, Serial No. 522,172, and in Germany March 20, 1930.

The present invention relates to water-insoluble azo-dyestuffs and fiber dyed therewith.

We have found that new valuable water-insoluble azo-dyestuffs are obtainable which are distinguished by fastness-properties far superior to those of similar dyestuffs of the same group by combining with an arylide of 2:3-hydroxynaphthoic acid, free from groups rendering the dyestuffs soluble in water, the diazo compound of a 1-amino-2:3:5-trimethylbenzene halogenated in 4-position and having the following formula

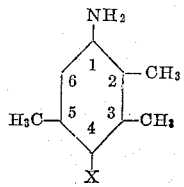

wherein X stands for halogen.

A great number of the combinations thus obtainable have a fastness to kier-boiling (boiling for 4 hours under a pressure of 1½ atmospheres with 160 cc. of caustic soda solution of 40° Bé. in 40,000 cc., of water per 1000 grams of material to be kier-boiled) which, hitherto, has been very rare with dyestuffs of the ice color group. Others of the combinations fulfill high requirements in respect of fastness to light and several of them combine an enhanced fastness to kier boiling with a good fastness to light. Besides all of them have good properties of fastness to boiling lye (boiling for 6 hours at atmospheric pressure with 100 cc. of caustic soda solution of 40° Bé. in 10,000 cc. of water per 1000 grams of material) and to chlorine. Furthermore, a great many of the dyestuffs obtainable according to the present invention have a vivid and clear Turkey red tint very much in demand by the cotton dyers. By the present invention it is possible to obtain dyeings of a Turkey red tint which is at the same time fast to kier boiling and to light; they supply a long felt want in the ice-color dyeing industry.

The new dyestuffs can be made in the usual manner by dyeing or printing them on the fiber or by producing them in substance or on any of the usual substrata adapted for the production of lakes.

The dyestuffs obtained by this invention correspond with the following general formula

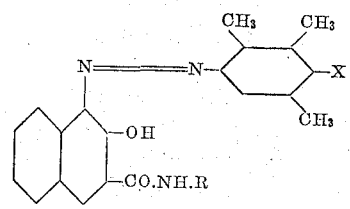

wherein X represents halogen and R represents a residue of the benzene or naphthalene series, the hydrogen atoms of which may be substituted but must not contain any free sulfonic- or carboxylic acid groups.

The following examples serve to illustrate the invention, but they are not intended to limit it thereto:

Dyeing prescriptions for Examples 1 and 2

50 grams of well boiled cotton yarn are treated for half an hour in the grounding liquor, the yarn is wound, well hydro-extracted or squeezed and dyed for half an hour in the dye-bath. The dyed cotton yarn is then rinsed several times, soaped at boiling temperature and rinsed again.

EXAMPLE 1

(a) Grounding liquor 5 grams of 2:3-hydroxynaphthoyl-1'-amino-2'-methoxy-4'-chlorobenzene are made into a paste with 10 cc. of Turkey red oil (50 per cent. strength) and 10 cc. of caustic soda solution of 34° Bé. and the whole is dissolved by pouring 1 liter of boiling water over it. After the solution has cooled to 50° C. 5 cc. of formaldehyde of 30 per cent. strength are added.

(b) Dye-bath 1.7 grams of 1-amino-4-chloro-2:3:5-trimethylbenzene are diazotized with 3.8 cc. of hydrochloric acid of 22° Bé. and 7.2 cc. of sodium nitrite solution (1:10) with addition of ice. The clear diazo-solution is rendered neutral to Congo paper by means of about 2 grams of crystallized sodium acetate and the whole is made up to 1 liter.

A vivid bluish Turkey red of good fastness to chlorine and light is obtained. By boiling the dyed material for 4 hours under a pressure of 1½ atmospheres in a solution containing 4 grams of NaOH per liter, it also shows a good fastness to kier boiling.

The dyestuff corresponds with the following formula

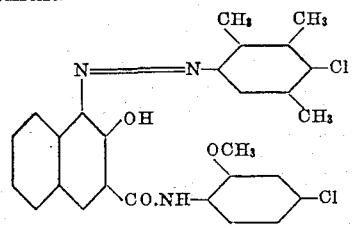

Example 2

(a) *Grounding liquor*

The grounding liquor is prepared as in Example 1 by using, however, 5 grams of 2:3-hydroxynaphthoyl-1'-amino-4'-chloro-2':5'-dimethoxy benzene.

(b) *Dye-bath*

The dyebath is the same as in Example 1. There is obtained a vivid clear Turkey red of good fastness to chlorine and weather which at the same time fulfils the high requirements in respect to fastness to light. By boiling the dyed material for 4 hours under a pressure of 1½ atmospheres in a solution containing 4 grams of NaOH per liter, it also shows a good fastness to kier boiling.

The dyestuff corresponds with the following formula

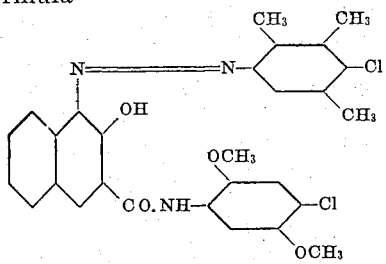

Example 3

32.3 grams of 2:3-hydroxynaphthoyl-1'-amino-2':5'-dimethoxybenzene are dissolved in 100 cc of a hot 2 N-caustic soda solution. 10 cc of Turkey red oil of 50 per cent. strength are added to the solution and after cooling it the arylide is precipitated in a finely dispersed state by means of 100 cc. of 2 N-acetic acid.

Furthermore, 17.0 grams of 1-amino-4-chloro-2:3:5-trimethylbenzene are diazotized with 3.8 cc. of hydrochloric acid of 22° Bé. and 7.2 grams of sodium nitrite with addition of ice and the clear diazo-solution is rendered neutral to Congo paper by means of about 20 grams of crystallized sodium acetate.

This solution is run into the arylide suspension prepared as above described. After stirring for a prolonged time the formation of the dyestuff is finished. It is filtered by suction and well washed with water.

The dyestuff forms a bluish-red paste of good fastness to light and corresponds with the following formula

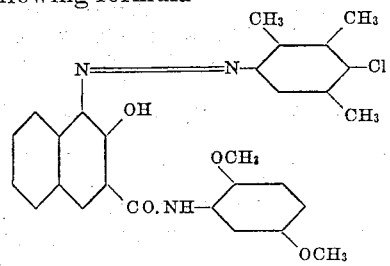

By using as coupling components other arylides of 2:3-hydroxynaphthoic acid and as diazotizing components 1-amino-2:3:5-trimethylbenzene substituted in the 4-position by chlorine, bromine or iodine, there are obtained dyestuffs of good properties similar to those mentioned in the preceding examples.

The following table indicates a number of dyestuffs obtainable according to the present invention but does not comprise all possibilities for the preparation of dyestuffs of very good fastness properties by using different components; it, therefore, is not intended to limit the invention to the dyestuffs mentioned therein:

| Diazotizing component | Coupling component | Tint |
|---|---|---|
| (1) 1-amino-4-chloro-2:3:5-trimethylbenzene | 2:3-hydroxynaphthoyl-1'-amino-2'-methylbenzene | Clear, very bluish red |
| (2) 1-amino-4-chloro-2:3:5-trimethylbenzene | 2:3-hydroxynaphthoyl-1'-amino-2'-methoxybenzene | Vivid middle red |
| (3) 1-amino-4-chloro-2:3:5-trimethylbenzene | 2:3-hydroxynaphthoyl-1'-amino-2'-methyl-4'-chlorobenzene | Very bluish red |
| (4) 1-amino-4-chloro-2:3:5-trimethylbenzene | 2:3-hydroxynaphthoyl-1'-amino-2'-methoxy-5'-chlorobenzene | Vivid bluish Turkey red |
| (5) 1-amino-4-chloro-2:3:5-trimethylbenzene | 2:3-hydroxynaphthoyl-1'-amino-2':3'-dimethoxybenzene | Ruby red |
| (6) 1-amino-4-chloro-2:3:5-trimethylbenzene | 2:3-hydroxynaphthoyl-1'-amino-4'-chloro-2':3':5'-trimethylbenzene | Vivid Turkey red |
| (7) 1-amino-4-chloro-2:3:5-trimethylbenzene | 2:3-hydroxynaphthoyl-1'-amino-4'-chloro-2':5'-diethoxybenzene | Vivid Turkey red |
| (8) 1-amino-4-chloro-2:3:5-trimethylbenzene | 2:3-hydroxynaphthoyl-1'-amino-4'-chloro-3'-methyl-6'-methoxybenzene | Vivid bluish Turkey red |
| (9) 1-amino-4-chloro-2:3:5-trimethylbenzene | 2:3-hydroxynaphthoyl-1'-aminonaphthalene | Ruby red |
| (10) 1-amino-4-chloro-2:3:5-trimethylbenzene | 2:3-hydroxynaphthoyl-2'-aminonaphthalene | Ruby red |
| (11) 1-amino-4-chloro-2:3:5-trimethylbenzene | 2:3-hydroxynaphthoyl-1'-amino-4'-methoxynaphthalene | Vivid Bordeaux red |
| (12) 1-amino-4-chloro-2:3:5-trimethylbenzene | 2:3-hydroxynaphthoyl-2'-amino-3'-methoxynaphthalene | Vivid Turkey red |
| (13) 1-amino-4-bromo-2:3:5-trimethylbenzene | 2:3-hydroxynaphthoyl-1'-amino-2':5'-dimethoxy-4'-chlorobenzene | Vivid bluish Turkey red |
| (14) 1-amino-4-bromo-2:3:5-trimethylbenzene | 2:3-hydroxynaphthoyl-2'-amino-3'-methoxynaphthalene | Vivid Turkey red |
| (15) 1-amino-4-iodo-2:3:5-trimethylbenzene | 2:3-hydroxynaphthoyl-1'-amino-2'-ethoxybenzene | Vivid bluish Turkey red |
| (16) 1-amino-4-iodo-2:3:5-trimethylbenzene | 2:3-hydroxynaphthoyl-1'-amino-2'-5'-dimethoxybenzene | Bluish red |

The bases mentioned in the above examples which have hitherto not been described in the pertaining art have the following properties:

1-amino-4-chloro-2:3:5-trimethylbenzene is obtainable by chlorination of 1-amino-2:3:5-trimethylbenzene. It crystallizes from petroleum ether in long, white loose needles melting at 110–111° C. It is scarcely volatile with steam, easily soluble in organic solvents.

1-amino-4-bromo-2:3:5-trimethylbenzene is obtainable by bromination of 1-amino-2:3:5-trimethylbenzene. It crystallizes from petroleum ether in long, white, brilliant needles melting at 116–117° C. It is easily soluble in organic solvents, very sparingly volatile with steam.

1-amino-4-iodo-2:3:5-trimethylbenzene is obtainable by iodinating 1-amino-2:3:5-trimethylbenzene. It crystallizes from alcohol in white needles, melting at 132–133° C. It is easily soluble in organic solvents, very sparingly volatile with steam.

Certain of the parent materials referred to in the foregoing examples and table, which are not generally known, may be made as follows:

2:3-hydroxynaphthoyl-1'-amino-4'-chloro-2':5'-dimethoxy-benzene can be prepared according to the statements in the U. S. A. application, Ser. No. 343,841, filed on March 1, 1929 in the name of Leopold Laska and Arthur Zitscher.

2:3-hydroxynaphthoyl-1'-amino-2':3'-dimethoxybenzene can be prepared by condensing with 2:3-hydroxynaphthoic acid the base obtainable as described in the Journal of the Chemical Society, Vol. III, page 79.

2:3-hydroxynaphthoyl-1'-amino-4'-chloro-2':3':5'-trimethylbenzene can be prepared by condensing with 2:3-hydroxynaphthoic acid 1-amino-4-chloro-2:3:5-trimethylbenzene obtainable as hereinbefore described.

2:3-hydroxynaphthoyl-1'-amino-4'-chloro-2':5'-diethoxybenzene can be prepared by condensing with 2:3-hydroxynaphthoic acid the base obtainable by reducing in the usual manner 1-nitro-2:5-diethoxy-benzene (obtainable as described on page 146 of "Liebig's Annalen der Chemie", Vol. 215) and then chlorinating the reduction product in para-position.

2:3-hydroxynaphthoyl-1'-amino-4'-chloro-3'-methyl-6'-methoxybenzene may be obtained by condensing with 2:3-hydroxynaphthoic acid the base prepared according to the statements given on page 396 of "Recueil des Travaux chimiques des Pays-Bas", Vol. 28.

2:3-hydroxynaphthoyl-1'-amino-4'-methoxy-naphthalene is obtainable according to the statements in the U. S. A. application Ser. No. 340,023 filed on February 14, 1929 in the name of Wilhelm Fitzky.

We claim:

1. As new products, the water-insoluble azo-dyestuffs of the following general formula:

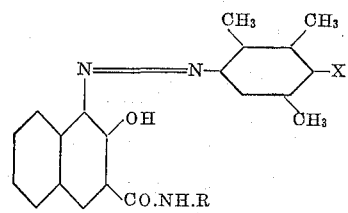

wherein X represents halogen and R represents a residue of the benzene or naphthalene series, which must not contain any free sulfonic- or carboxylic acid groups, dyeing vivid red shades and being distinguished by their good fastness properties, particularly by their good fastness to kier-boiling, to chlorine and to light.

2. As new products, the water-insoluble azo-dyestuffs of the following general formula:

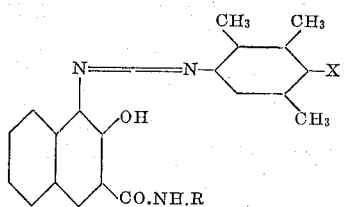

wherein X represents halogen and R represents a residue of the benzene series, which must not contain any free sulfonic- or carboxylic acid groups, dyeing vivid red shades and being distinguished by their good fastness properties, particularly by their good fastness to kier-boiling, to chlorine and to light.

3. As new products, the water-insoluble azo-dyestuffs of the following general formula

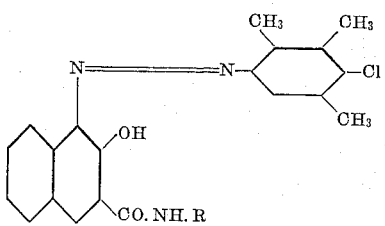

wherein R represents a residue of the benzene series, which must not contain any free sulfonic- or carboxylic acid groups, dyeing vivid red shades and being distinguished by their good fastness properties, particularly by their good fastness to kier-boiling, to chlorine and to light.

4. As a new product, the water-insoluble azo-dyestuff of the following formula

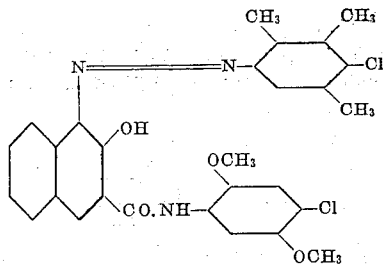

dyeing a vivid Turkey red shade and being distinguished by its good fastness properties, particularly by its good fastness to kier-boiling, to chlorine and to light.

5. As a new product, the water-insoluble azo-dyestuff of the following formula:

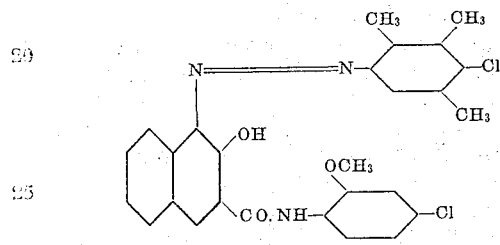

dyeing a vivid bluish Turkey red shade and being distinguished by its good fastness properties, particularly by its good fastness to kier-boiling, to chlorine and to light.

6. As a new product, the water-insoluble azo-dyestuff of the following formula

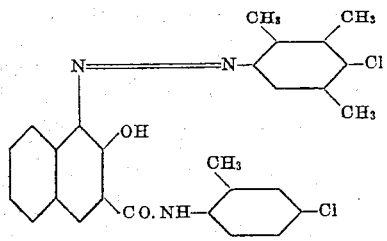
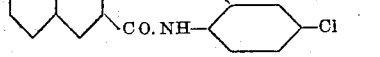

dyeing a bluish red shade and being distinguished by its good fastness properties, particularly by its good fastness to kier-boiling, to chlorine and to light.

7. Fiber dyed with the azo-dyestuffs as claimed in claim 1.
8. Fiber dyed with the azo-dyestuffs as claimed in claim 2.
9. Fiber dyed with the azo-dyestuffs as claimed in claim 3.
10. Fiber dyed with the azo-dyestuff as claimed in claim 4.
11. Fiber dyed with the azo-dyestuff as claimed in claim 5.
12. Fiber dyed with the azo-dyestuff as claimed in claim 6.

In testimony whereof, we affix our signatures.

HERMANN WAGNER.
HERBERT KRACKER.